April 30, 1957  J. E. CASTER ET AL  2,790,332
VARIABLE THROW CRANKS
Filed Oct. 27, 1953
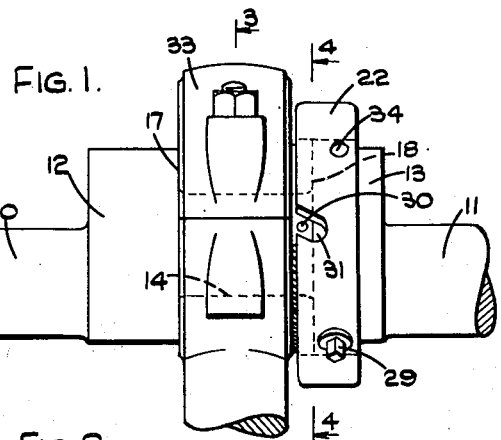
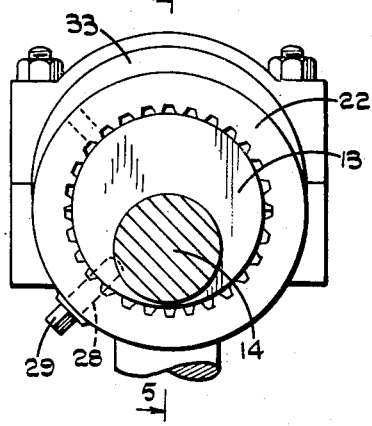
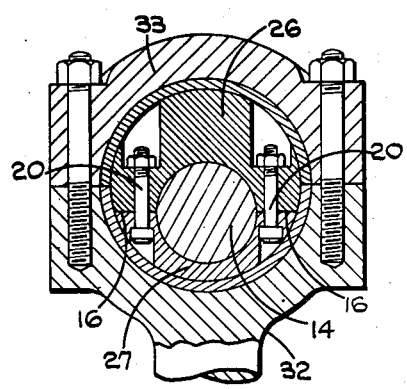
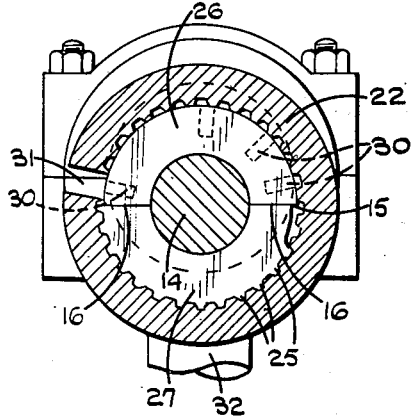
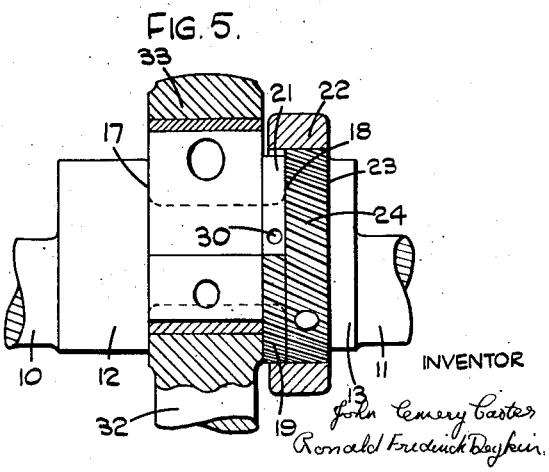

United States Patent Office 2,790,332
Patented Apr. 30, 1957

2,790,332
VARIABLE THROW CRANKS

John Emery Caster, Four Oaks, and Ronald Frederick Deykin, Erdington, Birmingham, England, assignors to Hordern, Mason & Edwards Limited, Birmingham, England, a British company Application October 27, 1953, Serial No. 388,568

Claims priority, application Great Britain October 27, 1952

8 Claims. (Cl. 74—571)

The present invention relates to adjustable throw cranks, and is especially although not exclusively applicable to power presses.

The invention refers to that kind of adjustable throw crank in which adjustment facility is provided by mounting an eccentrically-bored sleeve on the crankpin, this sleeve being capable of being set in any of a number of possible angular relationships with the crankpin by rotating it thereon, securement of the sleeve in the required angular relationship being effected by means of a removable or displaceable locking part which is adapted to engage with both the sleeve and a cheek or other part integral with or fixed to the crankpin.

In constructions of adjustable throw cranks of this kind as hitherto used or proposed the removable or displaceable locking part is generally of such a character that it is moved to the position of disengagement laterally, i. e. in a direction parallel to the axis of the crankpin. In situations where such adjustable throw cranks are habitually employed, for instance power presses, this lateral removal or displacement of the locking part is not readily accomplished. This arises firstly because it is necessary for reliable operation that such part shall engage or interfit relatively tightly with the crankpin cheek and sleeve to avoid any risk of lost motion or play between these parts under the high stresses and shock loads involved in press operation. Secondly, the structure which supports the crank as a whole is generally of such character as to present only relatively restricted space in the lateral direction for access to the locking part, and it is consequently difficult to apply lateral displacement pressure of appreciable magnitude thereto without auxiliary tools or appliances, which of course add to the complication and skill needed to effect the adjustment.

One object of the present invention is to provide a new or improved construction of adjustable throw crank by which these disadvantages are obviated or reduced.

A further object of the invention is to simplify the construction of a variable throw crank and in particular by the reduction in the number of mechanisms or devices necessary to perform locking of the adjustable eccentric sleeve and to move the locking means into and out of its operative locking position when it is required to adjust the eccentric sleeve.

Yet another object of the invention is to provide a construction of variable throw crank in which for a given axial length of crank bearing surface the distance between the supporting bearings for the crank spindles is reduced to a minimum value to permit of greater stiffness of the crank as a whole, and without sacrifice of the ability to move locking means axially into and out of its operative position for retaining and releasing the adjustable eccentric sleeve.

An adjustable throw crank in accordance with the invention comprises a crank spindle, a crankpin, and an intermediary crankpin cheek fixedly connected with the crankpin, an eccentrically bored sleeve mounted on the crankpin, a ring-like element arranged in concentric relation with adjacent portions of the sleeve and cheek, both of said portions having helical formations of the same hand and at least the formations on the sleeve having a plurality of starts, and the ring-like element having helical formations meshing therewith to perform the dual functions of securing the sleeve in any of a plurality of positions of angular adjustment relatively to the crankpin about the axis thereof, and to produce axial shift of the ring-like element in response to rotation thereof relatively to the cheek to withdraw the ring-like element from mesh with the helical formations of the sleeve when it is required to move the latter to another of its positions of adjustment, and means on the ring-like element for enabling it to be rotated to move it into and out of mesh with these last said helical formations.

The invention will now be described with reference to the accompanying drawings illustrating by way of example a preferred embodiment of same and wherein:

Figure 1 is a view in front elevation of one construction of variable throw crank in accordance with the present invention.

Figure 2 is a view of the same construction in end elevation looking at the right-hand side of Figure 1.

Figure 3 is a cross sectional view of the same construction on the line 3—3 of Figure 1.

Figure 4 is a further cross sectional view of the same construction on the line 4—4 of Figure 1, and Figure 5 is a view partly in cross section on the line 5—5 of Figure 2.

The construction of variable throw crank illustrated may be used for driving the reciprocating ram of a power press the stroke of which may be varied by varying the throw of the crank. Except for a fragment of the connecting rod indicated at 32 and including a conventional split ring bearing 33 the working parts of the press are not illustrated since these are not considered to be necessary for a proper understanding of the invention.

The crank comprises a pair of coaxial crank spindles 10, 11, adapted to be supported in suitable bearings which for the sake of clarity in presentation are omitted from the drawings but which advantageously extend and furnish support for the spindles up to their inner ends. The inner ends of these spindles are united integrally with respective crankpin cheeks 12, 13 each in the form of cylindrical blocks between which the crankpin 14 (Figures 2–4) itself extends, this also being united integrally with the cheeks. The term crankpin is used generically to denote any cylindrical element disposed eccentrically with respect to the crank spindles and is not limited to constructions in which the peripheral face of the crankpin lies outside or overlaps partially with the peripheral faces of the crank spindles; it may overlap completely with these latter faces in which case it would ordinarily be termed an eccentric.

The crankpin cheeks are arranged concentrically with the crankpin itself, and upon the latter is mounted an eccentrically-bored sleeve 15, the degree of eccentricity being dependent upon the range of throw variation required.

To facilitate assembly, this sleeve may be split along a diametrical plane indicated at 16 extending through the centre of the bore, this plane being at right angles to the diametral plane of symmetry of the sleeve, the components of the sleeve being secured together by bolts 20. It is not essential that the sleeve should be split along this particular diametrical plane 16, but the choice of this plane affords a certain degree of convenience with regard to machining operations to be performed on the sleeve, as will appear from the description hereafter given.

It will be understood that in certain constructions of crank, such as the open-ended type employed in "endwheel" presses, the sleeve can be assembled over the end of the crankpin and does not require to be of split construction.

The length of the sleeve may be equal to the length of the crankpin so that the end faces of the sleeve are adjacent to or lie in contact with the inner faces 17, 18 of the crankpin cheeks, and the marginal portion 19 (Figure 5) of the periphery of the sleeve adjacent to the cheek 13 is concentric with the periphery of this crankpin cheek, and is preferably flush therewith.

If the maximum wall thickness of the eccentric sleeve is less than the difference in diameters between the crankpin and the crankpin cheek, then this portion will be a flange which extends all the way round the sleeve at its end, the flange being of greater depth in some places than in others. If however, as illustrated, the maximum wall thickness of the eccentric sleeve is greater than the difference in diameters between the crankpin and crankpin cheek, there will be one region which will occur at or near the thickest part of the eccentric sleeve where this portion 19 will be inset from the periphery of the main portion of the sleeve, so that the marginal portion 19 will be in the form of a spigot 21 at one place and a flange at the diametrically opposite place as is seen more particularly in Figure 5.

Variation in the throw of the crank is effected by securing the sleeve in any one of a number of possible angular relationships with respect to the crankpin securement in the desired relationship being effected by a locking member, preferably in the form of a ring element 22 which facing extends around both the marginal portion facing 19 of the eccentric sleeve and the adjacent periphery 23 (Figure 5) of the crankpin cheek 13.

This ring element 22 is provided internally with inwardly presented formations, preferably of a toothed or splined character, which coact or interfit with complementary formations provided on the periphery of the crankpin cheek and marginal portion 19.

The internal formations on the ring 22 and on the crankpin cheek and portion 19 are in the form of oblique or helical splines or teeth, the number and width and pitch of these splines or teeth being so selected as to afford a plurality of starts, thereby providing the requisite number of possible positions of angular adjustment of the sleeve relatively to the crankpin cheek.

For example, as illustrated, helical splines 24 of approximately rectangular cross section, preferably tapering slightly in the outward radial direction, may be provided on the cheek periphery 23.

In the arrangement shown the number of starts (and hence the number of positions of adjustment) is equal to the number of splines or teeth.

In a case where the eccentric sleeve 15 is provided with a continuous flange extending around the whole of its periphery, the whole of the periphery of this flange may be splined as in the case of the crankpin cheek since this presents no particular difficulty in production. If, however, part of the portion 19 is inset or of spigotal form, as indicated at 21, it would be difficult although not impossible to spline this portion, and preferably therefor this portion is, as illustrated, machined down to have a plain arcuate periphery of diameter corresponding to the bases of the teeth in between the splines 25 on the flanged part of the marginal portion 19. As a matter of convenience this expedient may be carried out on the whole of the split eccentric sleeve portion 26 which includes this inset spigotal portion, and the splining of the eccentric sleeve being confined to the flange of the other portions 27 having the thinner wall.

The purpose of providing the helical or other obliquely arranged splines or teeth is to facilitate displacement of the locking ring in an axial direction from a locking position in which it engages the splines or teeth on both the crankpin cheek and the eccentric sleeve to a released position in which it no longer meshes with the latter.

In certain applications of the crank, notably in presses where a considerable degree of vibration is present due to the occurrence of shock loads, it is desirable to provide means for positively securing the locking ring 22 in the locking position, and for this purpose a radial bore 28 (Figure 2) may be provided therein which is threaded internally and in which operates a set screw 29, preferably of the dog-pointed type, the inner end entering a suitable radial bore in the crankpin cheek. Ordinarily, it will be found that one such set screw will be sufficient.

For intentionally displacing the locking ring axially to the released position when the set screw has been slackened back or removed, the locking ring may be provided with one or more tommy-bar sockets 34 or other formations by means of which an appropriate key having a radially-extending handle may be applied to the locking ring for the purpose of enabling this to be turned.

A further feature of the construction is the provision of aperture means conveniently in the form of a single open-ended slot 31 or opening in the wall of the locking ring which overlies the marginal portion 19 of the eccentric sleeve, in register with which opening the latter is situated selectively one of the sockets 30. By insertion through the slot 31 of a tommy bar or like tool into one of these sockets 30, the sleeve may be held against inadvertent rotation on the crankpin when the locking ring is being and has been displaced to its released position. There are a series of angularly spaced sockets 30 in the portion 19, against each of which may be marked the value of the crank throw when such socket is registered with the single slot 31 in the locking ring. Alternatively, this arrangement may be reversed and a series of slots provided in the locking ring and a single socket 30 in the eccentric sleeve facing, the latter having certain advantages in operation inasmuch as the tommy bar or tool which is utilized to hold the eccentric sleeve against inadvertent rotation may without removal from the socket be utilised to rotate the eccentric sleeve to a new adjusted position, whereat the locking ring can be returned to the locking position.

In the foregoing description the locking ring and cooperating formations on the periphery of the eccentric sleeve and crankpin cheek have been described as applied to only one crankpin cheek and one end of the eccentric sleeve; this has certain advantages inasmuch as it reduces the span between the supporting bearings for the crankshaft spindles, it being necessary to expose the eccentric sleeve laterally of the strap or big end 33 at one side of the latter only. It will be understood however that, if circumstances made it desirable, it would be within the scope of the invention to provide the above-described arrangements at both ends of the eccentric sleeve and on both crankpin cheeks.

A particularly important feature of the present construction is that the locking ring 22 has a width measured in the axial direction which does not exceed the width of the crankpin cheek 13 as can be seen particularly in Figure 5.

In consequence of this the locking ring 22 can be displaced to its released position in which it is disengaged from the helical splines on the portion 19 of the eccentric sleeve without the outer side face of the locking ring being moved axially beyond the outer side face of the associated cheek 13. It therefore becomes unnecessary to provide any substantial gap or space between this side face of the cheek and the adjacent part of the press such as the supporting bearing for the spindle 11 for accommodation of part of the locking ring when in its released position, thus permitting this reducing to a minimum the unsupported length of the crank between the spindle bearings.

The operation of the adjustable throw crank is as follows. Ordinarily the locking ring 22 will occupy the position shown in Figure 5 wherein it meshes with the helical splines or teeth 25 on the marginal portion 19 of the sleeve and with the helical splines or teeth 24 provided on the crank cheek, so as to retain the sleeve in an adjusted position in which these two sets of splines or teeth are in matching relation. When it is required to adjust the throw of the crank a tommy-bar or the like radially or approximately radially extending tool is engaged in the socket 34 on the locking ring and the retaining screw 29 of the locking ring is slackened off to withdraw its end portion from the underlying hole in the crank cheek thereby freeing the locking ring for combined rotation and axial movement. A further tommy-bar or the like radially or approximately radially extending tool is inserted in that one of the sockets 30 in the marginal portion 19 of the sleeve which is exposed through the slot 31, and the locking ring is then rotated by means of its tommy-bar in an anti-clockwise direction, as viewed in Figure 4, to effect axial withdrawal of the locking ring to the right, as seen in Figure 1 by virtue of the helical nature of the splines or teeth. The eccentric sleeve is then rotated to a new position of adjustment wherein another of the sockets 30 is brought into the position formerly occupied by that with which the second said tommy-bar was engaged, a tommy-bar is inserted in this new socket 30 and the first said tommy-bar is removed. The locking ring is then rotated clockwise as seen in Figure 4 by means of its tommy-bar to re-engage its splines or teeth with the splines or teeth 25, thereby retaining the sleeve in its new position of adjustment after which the retaining screw 29 of the locking ring is again tightened down. It will thus be observed that the helical splines or teeth perform a dual function of locking or retaining the sleeve in its adjusted position when the locking ring is in its operative locking position, and also producing axial disengagement of the locking ring in response to rotation thereof during the performance of an adjustment.

What we claim then is:

1. An adjustable throw crank comprising a crank spindle, a crankpin, and an intermediary crankpin cheek fixedly connected with the crankpin, an eccentrically bored sleeve mounted on the crankpin, a ring-like element arranged in concentric relation with adjacent portions of the sleeve and cheek, both of said portions having helical formations of the same hand, and at least the formations on the sleeve having a plurality of starts, and the ring-like element having helical formations meshing therewith to perform the dual functions of securing the sleeve in any of a plurality of positions of angular adjustment relative to the crankpin about the axis thereof, and to produce axial shift of the ring-like element in response to rotation thereof relatively to the cheek to withdraw the ring-like element from mesh with the helical formations of the sleeve when it is required to move the latter to another of its positions of adjustment, and means on the ring-like element for enabling it to be rotated to move it into and out of mesh with these last said helical formations.

2. An adjustable throw crank comprising a crank spindle, a crankpin, and an intermediary crankpin cheek fixedly connected with the crankpin, an eccentrically bored sleeve mounted on the crankpin, a ring-like element extending about peripheries of adjacent portions of the sleeve and cheek, both of said portions having helical formations of the same hand and at least the formations on the sleeve having a plurality of starts, and the ring-like element having internal helical formations meshing therewith to perform the dual functions of securing the sleeve in any of a plurality of positions of angular adjustment relative to the crankpin about the axis thereof, and to produce axial shift of the ring-like element in response to rotation thereof relatively to the cheek to withdraw the ring-like element from mesh with the helical formations of the sleeve when it is required to move the latter to another of its positions of adjustment, and means on the ring-like element for enabling it to be rotated to move it into and out of mesh with these last said helical formations.

3. An adjustable throw crank comprising a crank spindle, a crankpin, and an intermediary crankpin cheek fixedly connected with the crankpin, and having a periphery of which a portion at least is concentric with the crankpin, an eccentrically bored sleeve mounted on the crankpin, and having a marginal portion of its periphery adjacent to the cheek formed concentrically with the concentric peripheral portion of the cheek and of the same diameter, a ring-like element extending about peripheries of adjacent portions of the sleeve and cheek, the periphery of the cheek and the marginal portion of the sleeve having matching helical formations of the same hand each affording a plurality of starts, and the ring-like element having on its inner periphery axially continuous helical formations meshing therewith to perform the dual functions of securing the sleeve in any of a plurality of positions of angular adjustment relatively to the crankpin about the axis thereof, and to produce axial shift of the ring-like element in response to rotation thereof relative to the cheek to withdraw the ring-like element from mesh with the helical formations of the sleeve when it is required to move the latter to another of its positions of adjustment, and means on the ring-like element for enabling it to be rotated to move it into and out of mesh with these last said helical formations.

4. An adjustable throw crank comprising a crank spindle, a crankpin, and an intermediary crankpin cheek fixedly connected with the crankpin, and having a periphery of which a portion at least is concentric with the crankpin, an eccentrically bored sleeve split in a longitudinal plane lying perpendicular to the longitudinal plane of cross-sectional symmetry to divide the sleeve into a thick-walled portion and a thin-walled portion, the sleeve having a radially outwardly extending flange on the thin-walled portion of the sleeve concentric with the periphery of the cheek, the sleeve also having means securing its component portions together, a ring-like element extending about peripheries of adjacent portions of the flange and cheek, both of said portions having helical formations of the same hand and at least the formations on the flange having a plurality of starts, and the ring-like element having helical formations meshing therewith to perform the dual functions of securing the sleeve in any of a plurality of positions of angular adjustment relatively to the crankpin about the axis thereof, and to produce axial shift of the ring-like element in response to rotation thereof relative to the cheek to withdraw the ring-like element from mesh with the helical formations of the flange when it is required to move the latter to another of its positions of adjustment, and means on the ring-like element for enabling it to be rotated to move it into and out of mesh with these last said helical formations.

5. An adjustable throw crank comprising a crank spindle, a crankpin, and an intermediary crankpin cheek fixedly connected with the crankpin, an eccentrically bored sleeve mounted on the crankpin, a ring-like element extending about peripheries of adjacent portions of the sleeve and cheek, both of said portions having helical formations of the same hand and at least the formations on the sleeve having a plurality of starts, and the ring-like element having internal helical formations meshing therewith to perform the dual functions of securing the sleeve in any of a plurality of positions of angular adjustment relatively to the crankpin about the axis thereof, and to produce axial shift of the ring-like element in response to rotation thereof relative to the cheek to withdraw the ring-like element from mesh with the helical formations of the sleeve when it is required to move the latter to another of its positions of adjustment, the ring-like element having at least one opening positioned to afford access to the underlying sleeve, and the sleeve having means accessible through the opening adapted to enable the sleeve to be held against rotation or rotated to the required position of adjustment when the ring-like element is moved out of mesh therewith, and means on the ring-like element for enabling it to be rotated to move it into and out of mesh with these last said helical formations.

6. An adjustable throw crank comprising a crank spindle, a crankpin, and an intermediary crankpin cheek fixedly connected with the crankpin, an eccentrically bored sleeve mounted on the crankpin, a ring-like element extending about peripheries of adjacent portions of the sleeve and cheek, both of said portions having helical formations of the same hand and at least the formations on the sleeve having a plurality of starts, and the ring-like element having internal helical formations meshing therewith to perform the dual functions of securing the sleeve in any of a plurality of positions of angular adjustment relatively to the crankpin about the axis thereof, and to produce axial shift of the ring-like element in response to rotation thereof relative to the cheek to withdraw the ring-like element from mesh with the helical formations of the sleeve when it is required to move the latter to another of its positions of adjustment, the ring-like element having a single opening positioned to afford access to the underlying sleeve, and the sleeve having a plurality of circumferentially spaced sockets enabling a tommy-bar or like tool to be engaged with the sleeve to hold it against rotation or to rotate it when the ring-like element is moved out of mesh therewith, and markings associated with respective sockets for selective registration with said opening to furnish an indication of the adjusted position of the sleeve.

7. An adjustable throw crank comprising a crank spindle, a crankpin, and an intermediary crankpin cheek fixedly connected with the crankpin, and eccentrically bored sleeve mounted on the crankpin, a ring-like element of axial width within that of the cheek and extending about peripheries of adjacent portions of the sleeve and cheek, both of said portions having helical formations of the same hand and at least the formations on the sleeve having a plurality of starts, and the ring-like element having internal helical formations meshing therewith to perform the dual functions of securing the sleeve in any of a plurality of positions of angular adjustment relative to the crankpin about the axis thereof, and to produce axial shift of the ring-like element in response to rotation thereof relatively to the cheek to withdraw the ring-like element from mesh with the helical formations of the sleeve while maintaining within the outer lateral extremity of the cheek when it is required to move the latter to another of its positions of adjustment, and means on the ring-like element for enabling it to be rotated to move it into and out of mesh with these last said helical formations.

8. In a power press; a variable throw crank operatively connected with a ram to reciprocate same said crank comprising a pair of aligned crank spindles spaced axially apart and a crankpin fixedly connected thereto in radially and axially offset relation between said spindles by crankpin cheeks integral with said spindles and said crankpin, bearings for said spindles supporting same substantially up to the outer lateral extremities of said cheeks, and an eccentrically bored sleeve mounted on said crankpin, and means for securing said sleeve in any of a plurality of angular relationships about the axis of the crankpin comprising a locking member formed as a ring-like element of a width not substantially exceeding that of the crankpin cheek and provided on its inner periphery with helical formations affording a plurality of starts, said element extending about and keying with adjacent portions of the sleeve and crankpin cheek these being provided also with helical formations on their outer peripheries, the ring-like element being axially movable between an operative position in which it effectively keys said sleeve to said cheek and a released position in which it is out of mesh with said sleeve to free same for angular adjustment on said crankpin, the ring-like element further having means for receiving a radially or approximately radially projecting tool enabling said element to be rotated to effect such axial movement.

References Cited in the file of this patent
UNITED STATES PATENTS

| 258,693 | Barrody | May 30, 1882 |
| 1,258,020 | Kloche | Mar. 5, 1918 |
| 1,757,414 | Collins | May 6, 1930 |
| 2,158,873 | Kaltwasser | May 16, 1939 |
| 2,454,881 | Michelman | Nov. 30, 1948 |